(12) United States Patent
Shiomi et al.

(10) Patent No.: US 6,341,943 B1
(45) Date of Patent: Jan. 29, 2002

(54) BLOWER

(75) Inventors: Iwaji Shiomi; Giichiro Shimizu; Masaaki Tanabe; Hirokazu Nagai; Akira Takanaka, all of Tokyo (JP)

(73) Assignee: Nitto Kohki Co. Ltd., Tokyo (JP)

( * ) Notice: Subject to any disclaimer, the term of this patent is extended or adjusted under 35 U.S.C. 154(b) by 0 days.

(21) Appl. No.: 09/593,080

(22) Filed: Jun. 13, 2000

(30) Foreign Application Priority Data

Jun. 14, 1999 (JP) .............................. 11-167380

(51) Int. Cl.⁷ ................................. F04B 49/24
(52) U.S. Cl. ..................... 417/26; 417/12; 417/45; 62/84
(58) Field of Search ................. 417/313, 315, 417/423.9, 26.3, 286, 427; 137/565.16, 565.18, 565.33

(56) References Cited

U.S. PATENT DOCUMENTS

| | | | | |
|---|---|---|---|---|
| 4,269,352 A | * | 5/1981 | Przystawik | 239/17 |
| 4,519,748 A | * | 5/1985 | Murphy et al. | 417/45 |
| 4,863,355 A | * | 9/1989 | Odagiri et al. | 417/12 |
| 4,870,831 A | * | 10/1989 | Kitamoto | 62/84 |

FOREIGN PATENT DOCUMENTS

| | | | | |
|---|---|---|---|---|
| JP | 10-196547 A | * | 7/1998 | 417/44.1 |
| JP | 10-196547 | | 7/1998 | |

\* cited by examiner

*Primary Examiner*—Charles G. Freay
*Assistant Examiner*—Han Lieh Li
(74) *Attorney, Agent, or Firm*—Pennie & Edmonds LLP

(57) ABSTRACT

A blower supplies compressed air to a predetermined place. The blower is provided with a plurality of compressors, a common air tank for storing compressed air supplied from the compressors, a changeover valve for switching the compressed air taken in from the air tank between a first supply state and a second supply state, and a controller for controlling operations of the compressors and the switching operation of the changeover valve. The controller can select one operation pattern from among a plurality of operation patterns determined by combinations between the compressors and the changeover valve.

11 Claims, 10 Drawing Sheets

BLOWER

CROSS-REFERENCE TO RELATED APPLICATIONS

This application is based upon and claims the benefit of priority from the prior Japanese Patent Application No. 11-167380, filed Jun. 14, 1999, the entire contents of which are incorporated herein by reference.

BACKGROUND OF THE INVENTION

The present invention relates to a blower, more particularly to a blower suitable for use in a septic tank of bio-filtration type.

In accordance with a rise in the awareness of environmental issues, more and more septic tanks have come into use. A septic tank is employed for the treatment of sewage, which is a water resource, i.e. one of the environmental resources. The septic tank is made up of: a settling separation tank into which sewage is supplied; a contact aeration tank into which the sewage is supplied after being cleared of the solid components in the settling separation tank; and a sedimentation tank to which the sewage is supplied after being treated with microorganisms in the contact aeration tank. In the sedimentation tank, the coagulated microorganisms (sludge) settle, and the supernatant liquid is disinfected and drawn off.

Inside the contact aeration tank, a contact filter medium is provided. Aerobic microorganisms attached on the surface of the contact filter medium propagate themselves in the presence of aerating air, which is supplied from a blower (air blower) by way of a pipe and an air diffuser. The organic matter included in the sewage is thus decomposed. Since the contact filter medium is contaminated in accordance with this decomposition, it is cleaned regularly or irregularly by supplying blowback air from the blower to the contact filter medium for a predetermined length of time of a day.

In the conventional art, a changeover valve is arranged in the pipe through which the compressed air from the blower flows. The changeover valve is provided for supplying aeration air or blowback air from the blower to the contact aeration tank. The valve is changed over between the aeration position and the blowback position. This type of prior art is disclosed in Jpn. Pat. Appln. KOKAI publication No. 10-196547, for example.

In general, the amount of blowback air supplied into a contact aeration tank per unit time is dependent on the type of that contact aeration tank. Regardless of the type, the amount of blowback air supplied must be controlled in relation to the amount of aeration air supplied during the same unit time. In the prior art, the amount of air supplied is controlled by using such a changeover valve as described above. Hence, the control of the changeover valve is complicated, and the amount of air supplied is hard to control with high accuracy.

BRIEF SUMMARY OF THE INVENTION

An object of the present invention is to provide a blower which has solved the problems described above and which enables easy switching of air supply states. An another object of the invention is to provide a blower which enables the entire apparatus incorporating it to be simple in structure, small in size, and low in manufacturing cost.

To achieve these objects, the present invention provides a blower comprising:
  a plurality of compressors;
  a common air tank for storing compressed air supplied from the compressors;
  a switching device for switching the compressed air taken in from the air tank between a first supply state and a second supply state; and
  a controller for controlling operations of the compressors and a switching operation of the switching device, the controller being capable of selecting one operation pattern from among a plurality of operation patterns determined by combinations between the compressors and the switching device.

The switching device of the present invention is a changeover valve having: an intake port from which the compressed air supplied from the air tank is taken in; a first discharge port used in the first supply state; and a second discharge port used in the second supply port. The changeover valve selects one of the first and second discharge ports and discharges the compressed air taken in from the intake port to the selected discharge port.

The controller of the present invention selectively drives the compressors. When the changeover valve is changed over to the second discharge port, the controller selects an operation pattern under which the compressors are driven momentarily in an overlap manner.

The controller of the present invention drives the compressors in parallel. Each time the changeover valve is changed over to the second discharge port, the compressors are alternately stopped in accordance with a period in which the second discharge port is used for air supply. The time when the changeover valve is changed over is shifted from the time when the compressors are selectively stopped.

The present invention also provides a blower comprising:
  a compressor;
  an air tank for storing compressed air supplied from the compressor;
  a changeover valve including an intake port from which the compressed air supplied from the air tank is taken in, a first discharge port, a second discharge port, a valve body movable such that the intake port selectively communicates with one of the first and second discharge ports, a member for urging the valve body to a position where the valve body allows the intake port to communicate with the first discharge port, a back-pressure chamber for producing back pressure which enables the valve body to move, against the urging force of the urging member, to a position where the valve body allows the intake port to communicate with the second discharge port, and a back-pressure intake port from which the back pressure is taken into the back-pressure chamber, the valve body of the changeover valve being moved by the urging force of the member to the position where the valve body enables the intake port to communicate with the first discharge port, and when the back pressure is taken into the back-pressure chamber, the valve body is moved by the back pressure to the position where the valve body enables the intake port to communicate with the second discharge port; and
  a valve including an intake port from which the compressed air supplied from the air tank is taken in, the compressed air taken in from the intake port being supplied to the back-pressure intake port of the changeover valve when the changeover valve supplies the compressed air of the air tank to the second discharge port.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
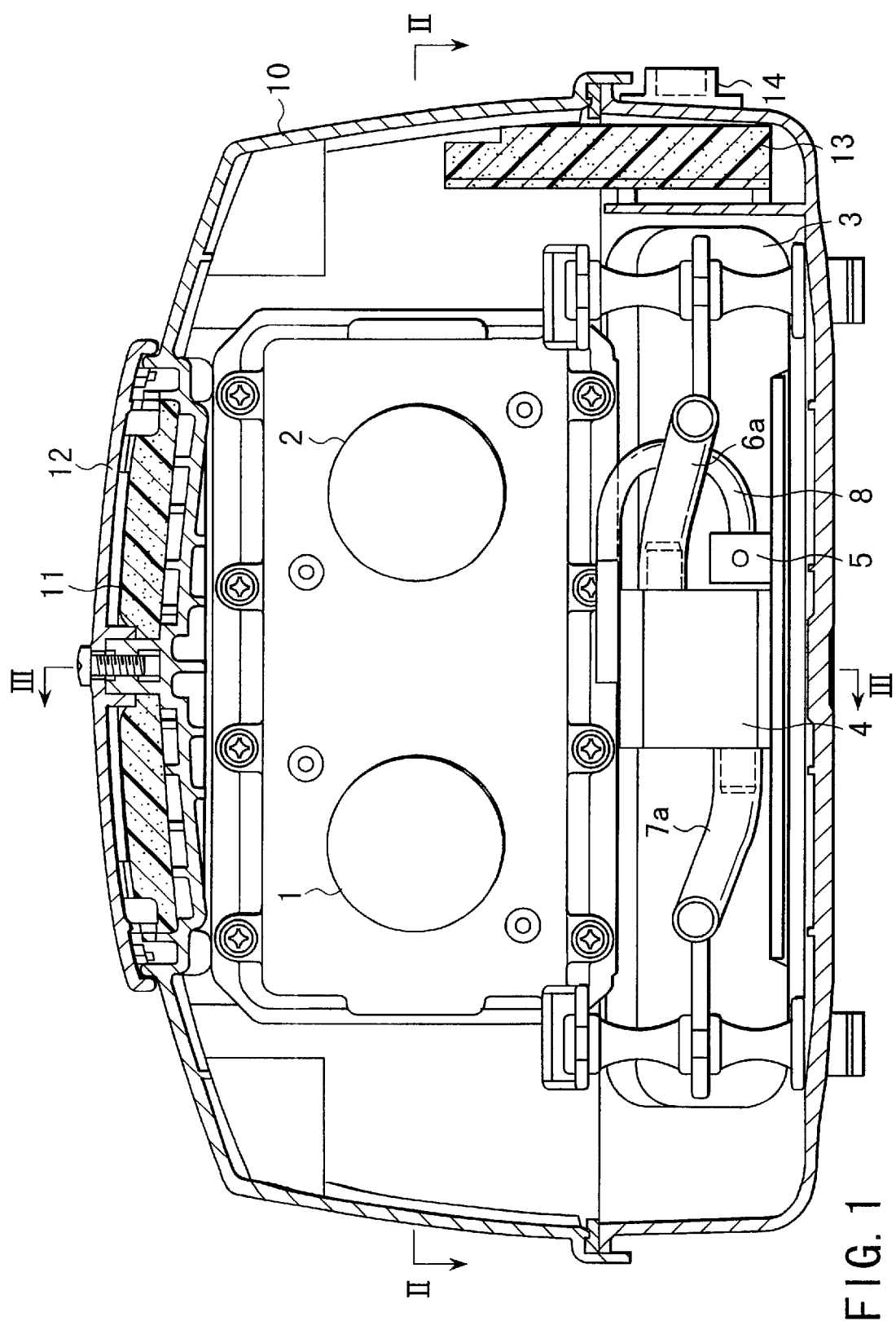
FIG. 1 is a front view of an automatic blowback blower according to one embodiment of the present invention, the case of the blower being cut away to show the internal structure.
Figure 2:
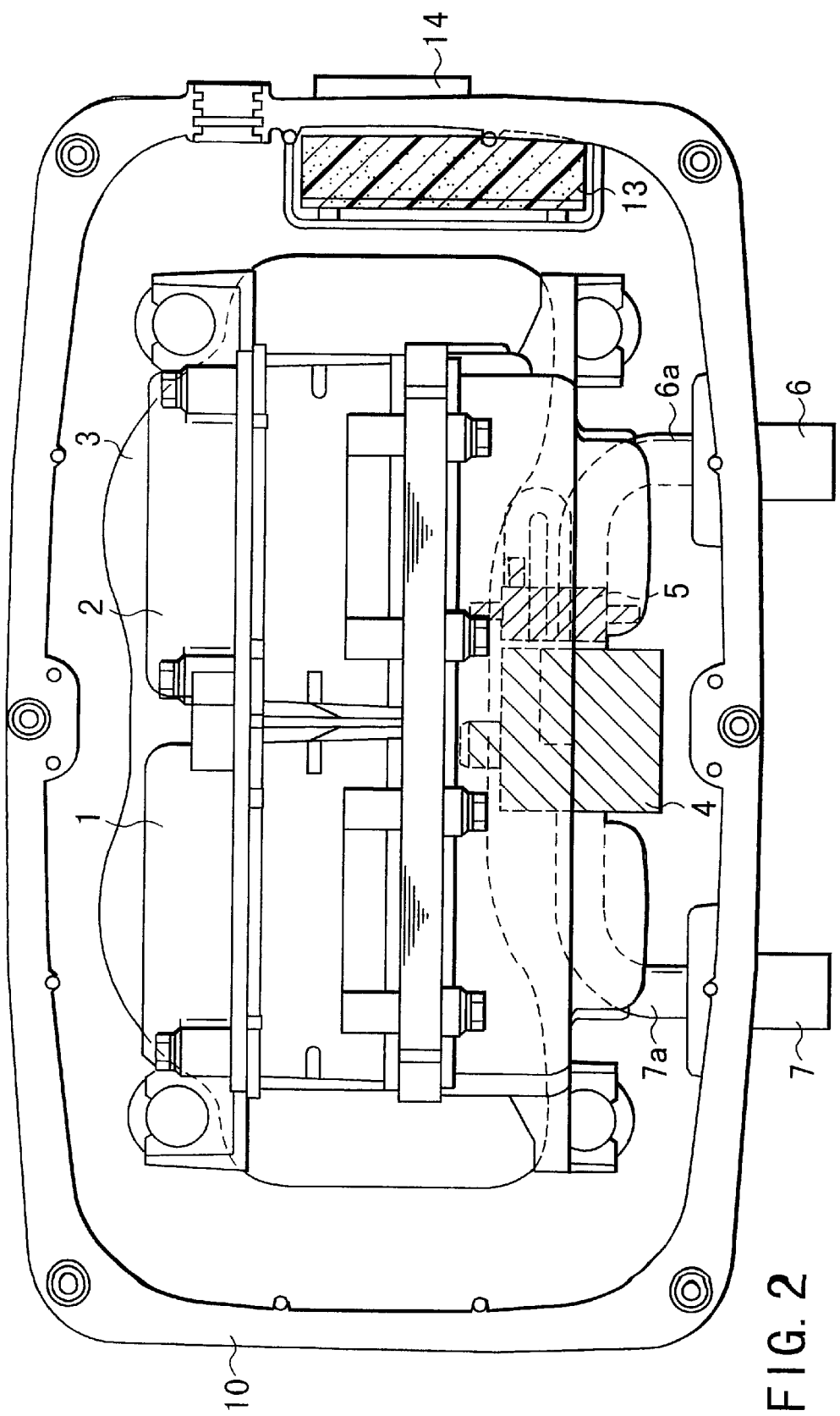
FIG. 2 shows an internal structure as viewed from line II—II of FIG. 1.
Figure 3:
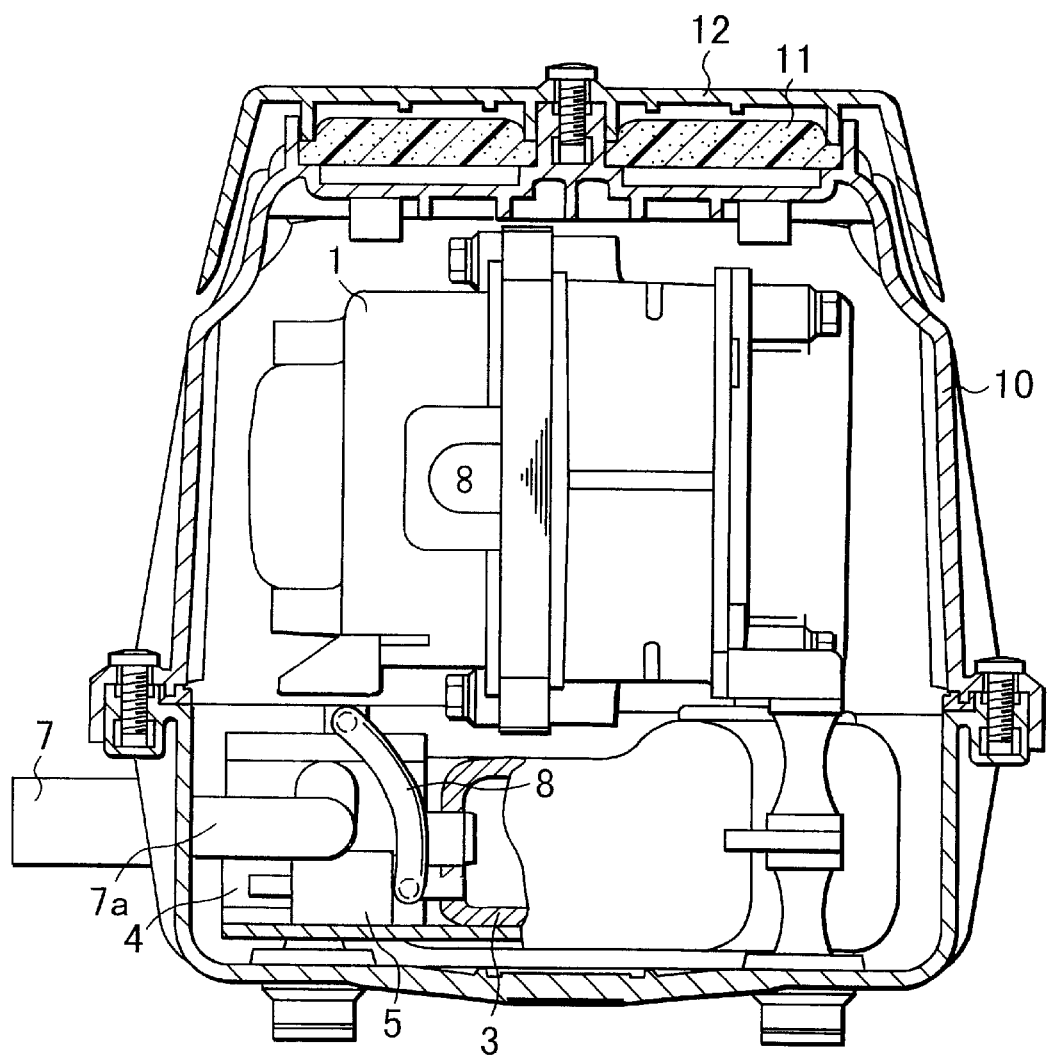
FIG. 3 shows an internal structure as viewed from line III—III of FIG. 1, with the case being cut away.

The present invention will now be described in detail with reference to the accompanying drawings. FIG. 1 is a front view of an automatic blowback blower according to one embodiment of the present invention. In FIG. 1, the case of the blower is cut away to show the internal structure. FIG. 2 shows an internal structure as viewed from line A—A of FIG. 1. FIG. 3 shows an internal structure as viewed from line B—B of FIG. 1, with the case being cut away.

Two compressors 1 and 2 are located in the center of the automatic blowback blower, and an air tank 3 for storing the air compressed by the compressors 1 and 2 is arranged underneath the compressors. Arranged in front of the air tank 3 are a changeover valve 4 which communicates with the air tank 3, and a three-way electromagnetic valve 5 which controls the changeover operation of the changeover valve. Pipes 6a and 7a are connected to the changeover valve 4. Pipe 6a constitutes a normal aeration port 6, and pipe 7a constitutes a blowback aeration port 7.

As shown in FIG. 1, an air cleaner member 11 formed of a sponge or the like is provided on top of the automatic blowback blower. A cover 12 is placed on the air cleaner member 11, so that the air cleaner member 11 does not separate from the case 10 of the automatic blowback blower. A control signal reception port 14 is provided on the right side of the automatic blowback blower. Through the control signal reception port 14, control data for determining a blowback time and a blowback interval are supplied to a controller 13.

Figure 4:
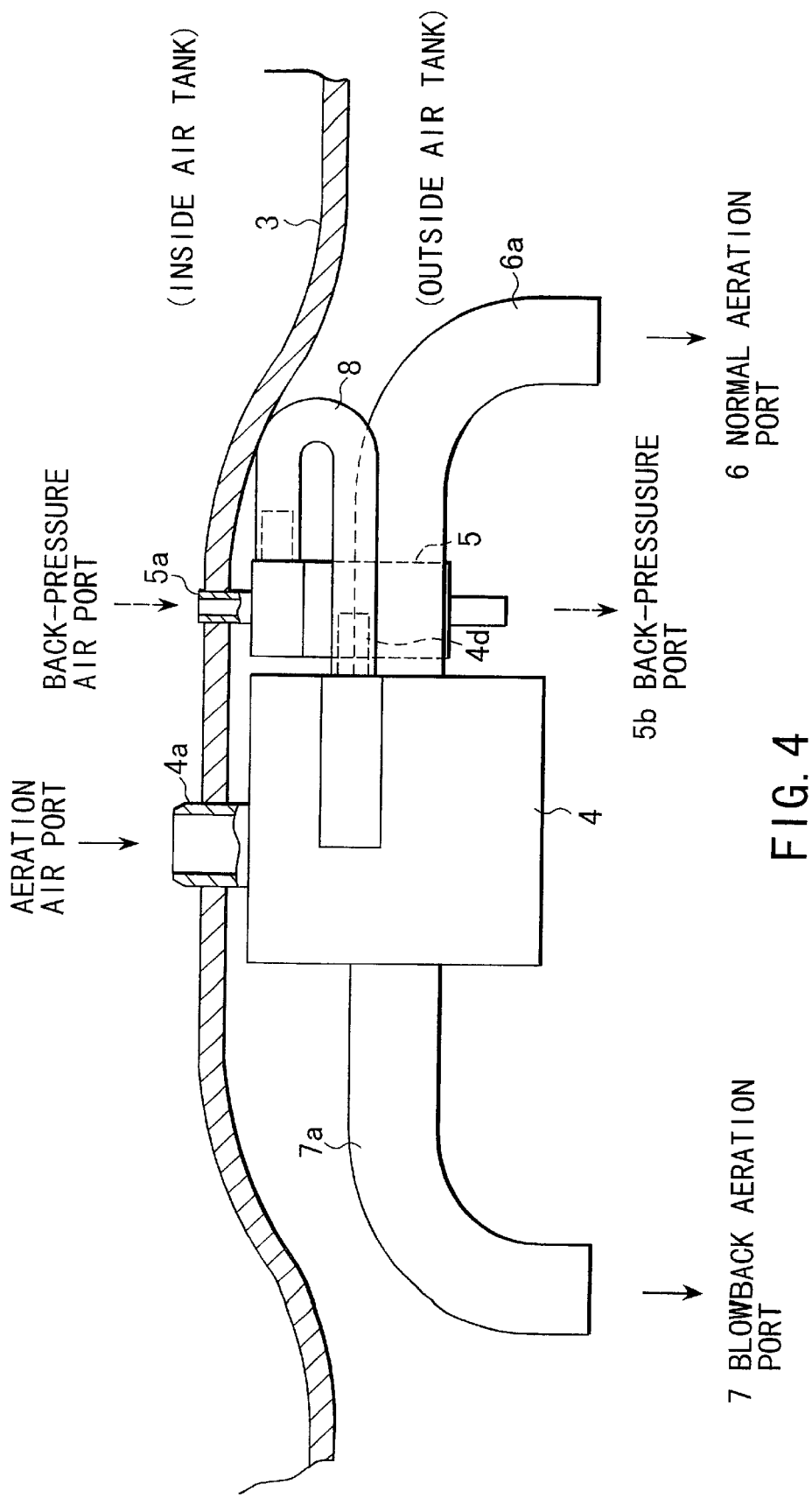
FIG. 4 is an explanatory illustration showing the structure of an air tank, a changeover valve and a three-way valve.

FIG. 4 shows how the air tank 3, the changeover valve 4 and the three-way electromagnetic valve 5 are connected together. The intake port 4a of the changeover valve 4 and the intake port 5a of the three-way electromagnetic valve 5 are connected to the air tank 3 directly, i.e., without connection hoses. Since no connection hose is provided between the air tank 3 and the changeover valve 4 or between the air tank 3 and the three-way electromagnetic valve, the structure surrounding the changeover valve 4 is simple and small in size, accordingly, and can be manufactured at low cost. The three-way electromagnetic valve 5 is provided with a supply port and a back-pressure port 5b, as well as the intake port 5a. The back-pressure port 5b is open in the atmosphere.

Figure 5:
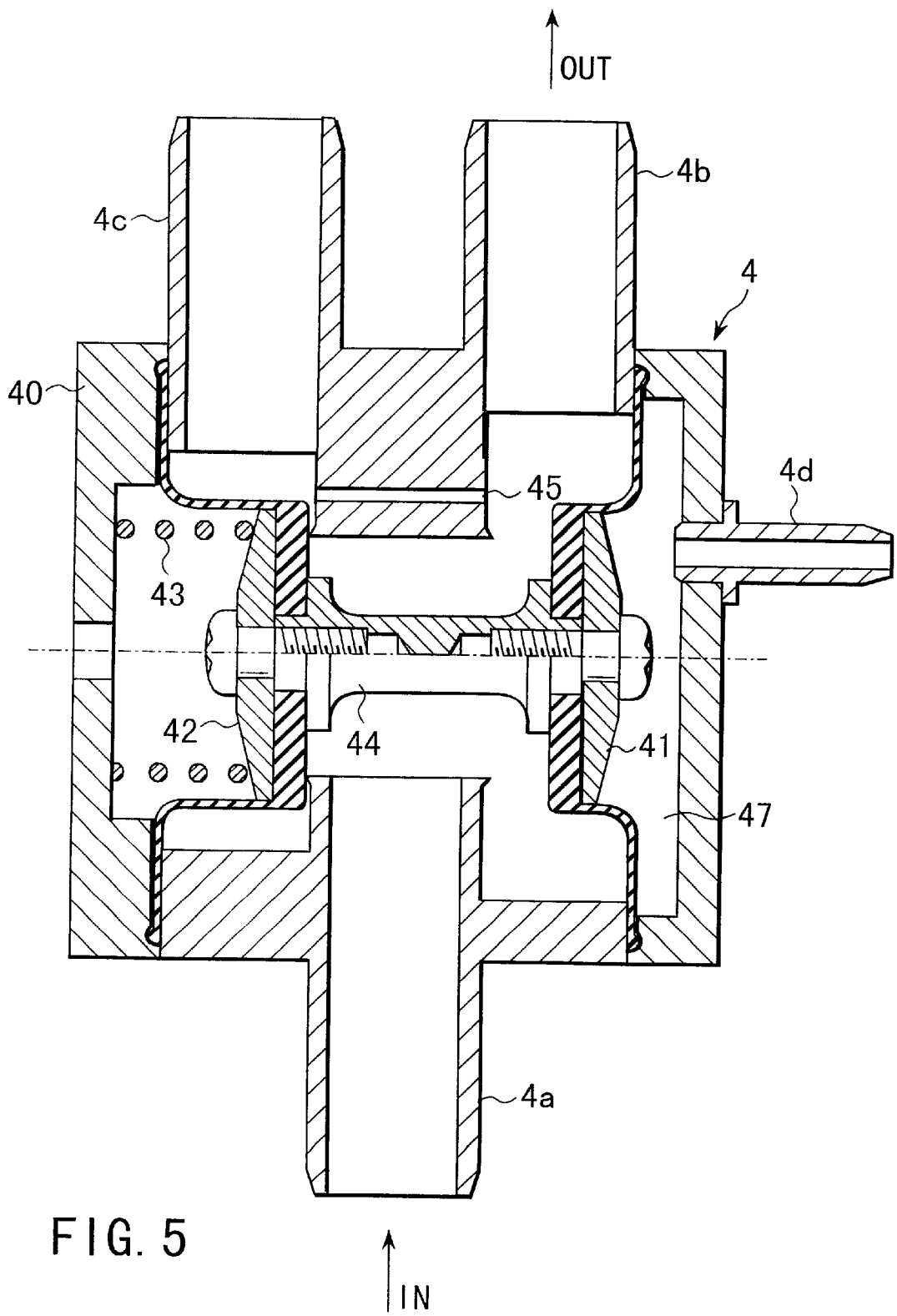
FIG. 5 is a sectional view of an example of a changeover valve.

The structure of the changeover valve 4 will be described with reference to FIGS. 5 and 6. These Figures are sectional views of the changeover valve 4. The changeover valve 4 has members for defining an intake port 4a, an aeration port 4b (which serves as a first discharge port), a blowback port 4c (which serves as a second discharge port), and a back-pressure intake port 4d. The members defining these ports are integral with a case 40. The case 40 defines a valve chamber therein, and a first valve body 41, a second valve body 42, a spring 43 for urging the first and second valve bodies 41 and 42, etc. are arranged in the valve chamber. The first and second valve bodies are flexible, and they are coupled together by a rigid member 44 in such a manner as to form one integral changeover valve body. In the valve chamber, a back-pressure chamber 47 communicating with the back-pressure intake port 4d is defined behind the first valve body 41, and the spring 43 described above is arranged behind the second valve body 42. The aeration port 4b and the blowback port 4c communicate with each other by way of a small-diameter hole 45. When the aeration port 4b is closed by the valve body 41, the hole 45 allows a certain amount of air to be supplied into the aeration port 4b. Conversely, when the blowback port 4c is closed by the valve body 41, the hole 45 allows a certain amount of air to be supplied into the blowback port 4c. Thus, the hole 45 serves to prevent the clogging of an air diffuser. As shown in FIGS. 7A and 7B, the hole 45 may be provided with a valve functioning as a throttle valve 46. In the case where this structure is adopted, the flow rate can be adjusted in the blowback mode. It should be noted that the hole 45 is not essential to the present invention. In other words, the present invention can be reduced to practice without any problems, even where the hole 45 is not provided.

In the normal aeration mode, the back-pressure air from the back-pressure intake port 4d is not supplied to the changeover valve 4. As shown in FIG. 5, therefore, the second valve body 42 is moved, by the urging force of the spring 43, to the position where it closes the blowback port 4c. Since the first valve body 41 opens the aeration port 5b then, the compressed air supplied to the intake port 4a is guided to the aeration port 4b.

Figure 6:
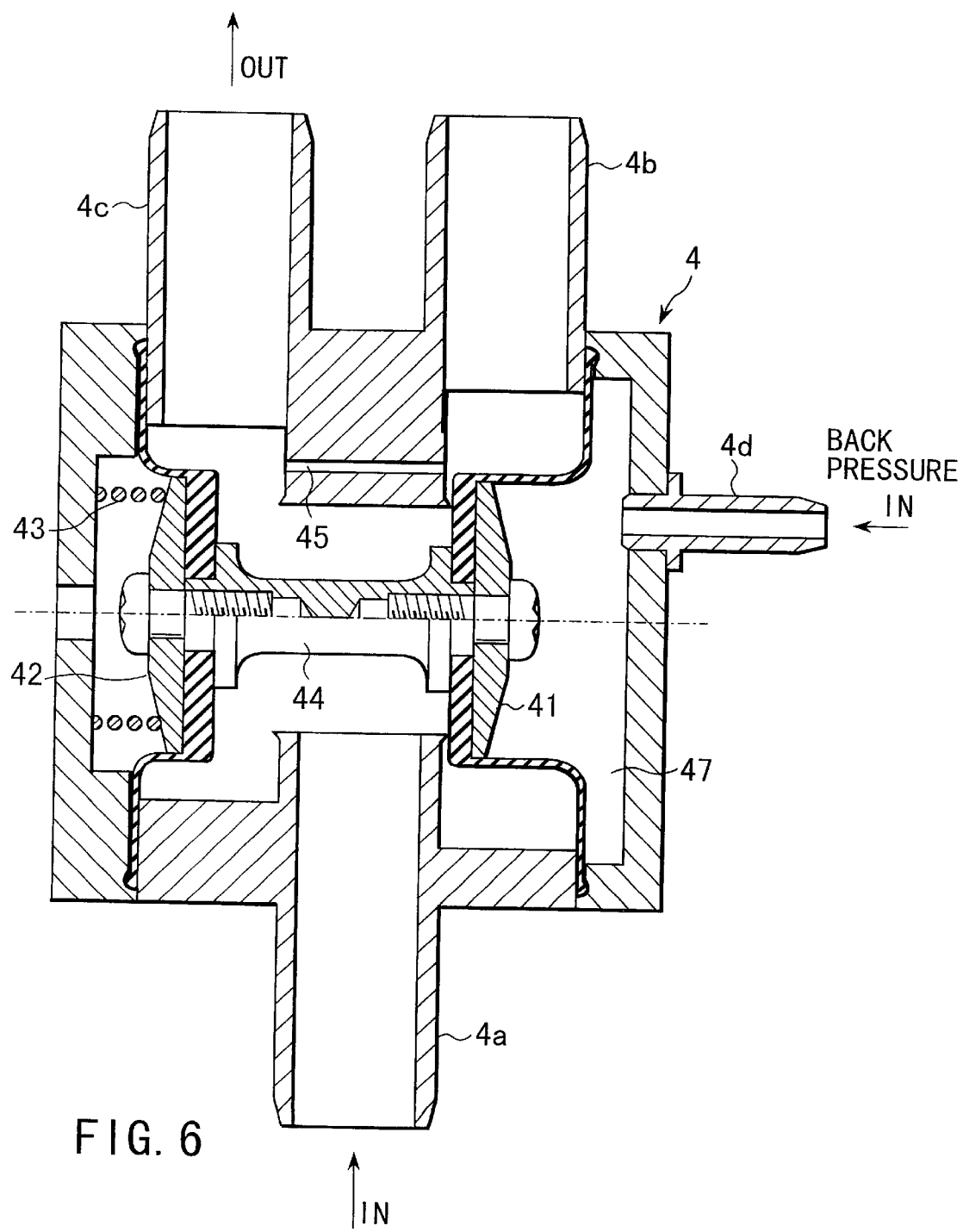
FIG. 6 is also a sectional view of an example of a changeover valve.
Figures 7A, 7B:
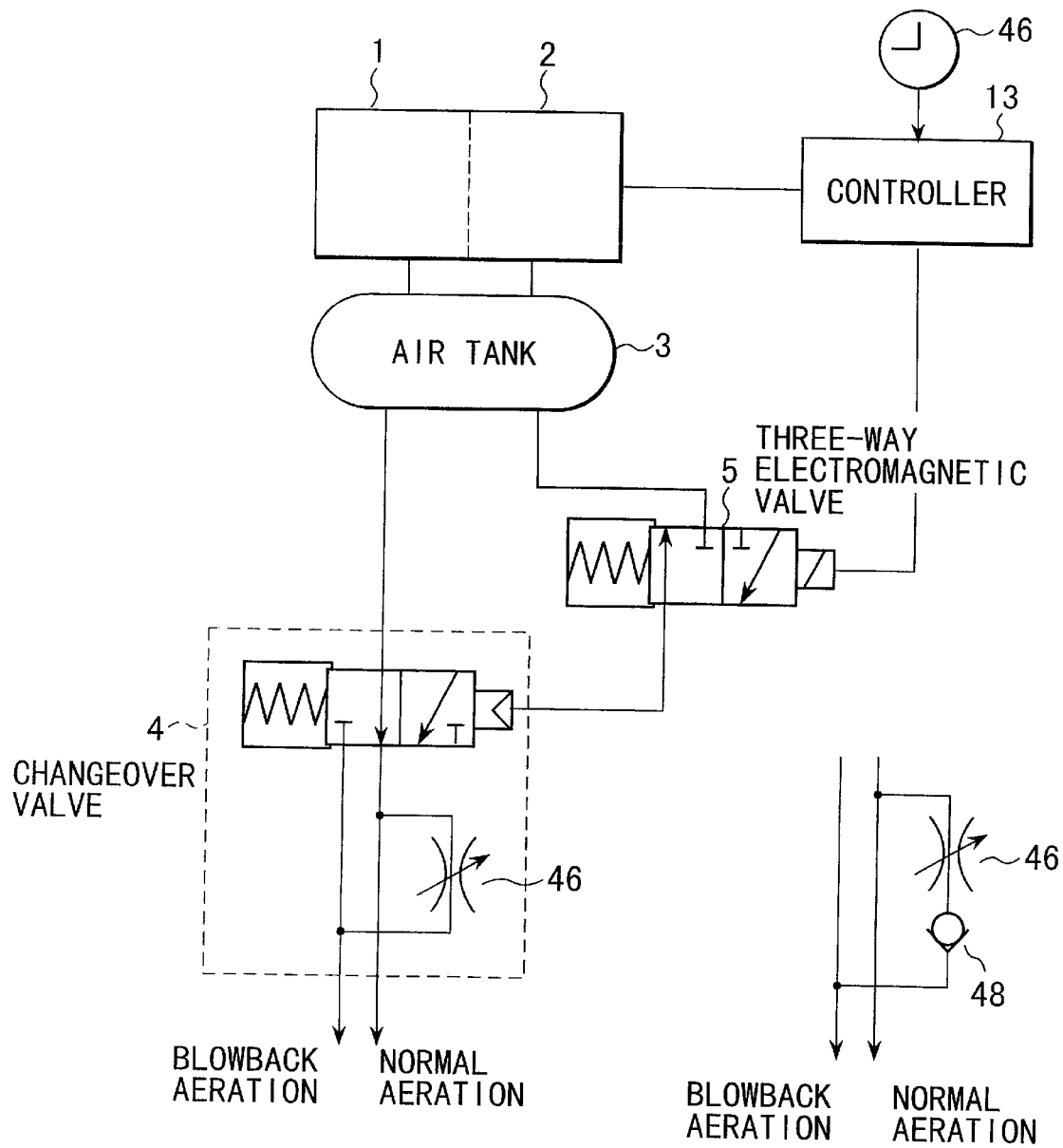
FIGS. 7A and 7B are block diagrams of a main-portion system configuration according to one embodiment of the present invention.

In the blowback aeration mode, the first valve body 41 is exerted with back pressure, as shown in FIG. 6. Since this pressure is greater than the repulsive force of the spring 43, the first and second valve bodies 41 and 42 move in one body to the leftward direction as viewed in FIG. 6 against the repulsive force of the spring 43. As a result, the first valve body 41 closes the aeration port 4b, and the second valve body 42 opens the blowback port 4c. Hence, the compressed air supplied into the intake port 4a is guided to the blowback port 4c.

FIGS. 7A and 7B are block diagrams of a main-portion system configuration according to one embodiment of the present invention. In FIG. 7A, the same reference numerals as used in FIGS. 1–3, 5 and 6 denote the same or equivalent structural elements, with the only exception of the reference numeral "46" assigned to a timer. In FIG. 7B, a modification of the system configuration is also indicated. According to the modification, a check valve 48 is arranged in series with the throttle valve 46. In the normal aeration mode, this check valve 46 prevents air from flowing into the blowback tube by way of the throttle valve 46.

The controller 13 controls the compressors 1 and 2 and the three-way electromagnetic valve 5 in accordance with data entered from a remote control (not shown) and supplied through the control signal reception port 14 (FIG. 1). The data include a blowback time (e.g., 5 minutes, 10 minutes, or 15 minutes), a blowback interval (e.g., once a day, once in two days, or once in three days), the execution or non-execution of a forcible blowback operation), etc. According to the present embodiment, three operation patterns 1 to 3, examples of which will be described below, are prepared beforehand. The controller 13 selects one of the operation patterns, so that control suitable for the type of the septic tank can be easily performed. Examples of operation patterns executed by the controller 13 will be described with reference to FIGS. 8 to 10.

Figure 8:
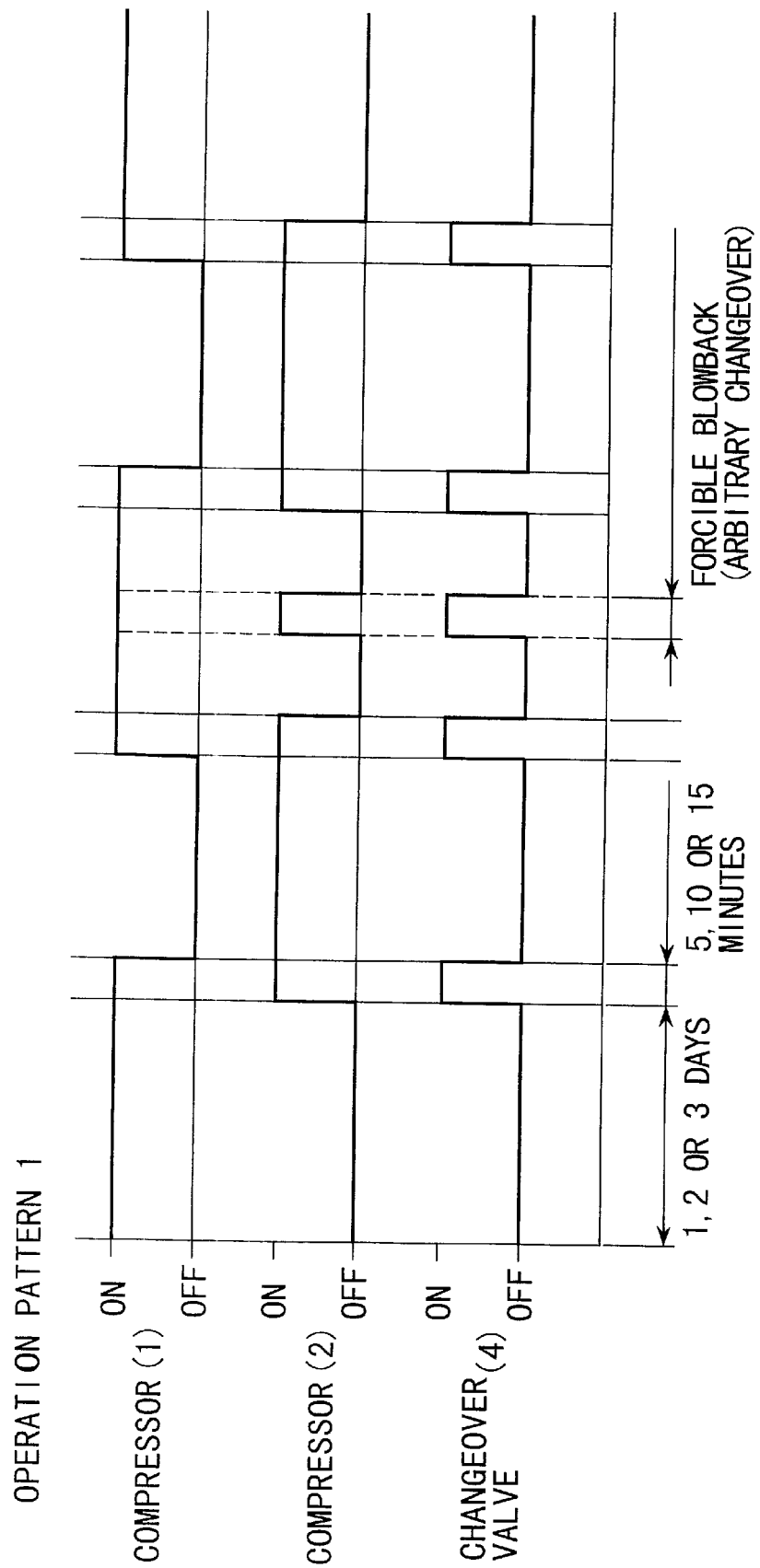
FIG. 8 is a timing chart illustrating operation pattern 1.

Operation Pattern 1 (FIG. 8)

This is an operation pattern wherein a larger amount of air is used in the blowback aeration than in the normal aeration. The compressors 1 and 2 are switched from one to the other in accordance with the blowback timings. For example, if the blowback is executed once a day, the compressors 1 and 2 are switched from one to the other every day. At the time of switching, both the compressors 1 and 2 are driven simultaneously for the length of time corresponding to the blowback time, e.g., for five minutes. In addition, the three-way electromagnetic valve 5 is actuated by supplying an actuation signal. When the three-way electromagnetic valve 5 is in operation, the air from the air tank 3 passes through the electromagnetic valve 5 and flows into the back-pressure intake port 4d of the changeover valve 4, causing the changeover valve 4 to be changed over in the manner shown in FIG. 6. As a result, double-amount air, namely, the sum of the outputs of compressors 1 and 2, is used for the blowback aeration. To execute a blowback operation at an arbitrary time, the compressor which is stationary then is driven for the blowback time, e.g., for five minutes, with the changeover valve 4 being changed over to the position for the blowback aeration.

According to this operation pattern, the control performed by the controller 13 is simple and yet enables the amount of air used in the blowback aeration to be twice the amount of air used in the normal aeration. In addition, since the compressors 1 and 2 are operated by turns, they withstand long use, contributing to the long life of the automatic blowback blower.

Figure 9:
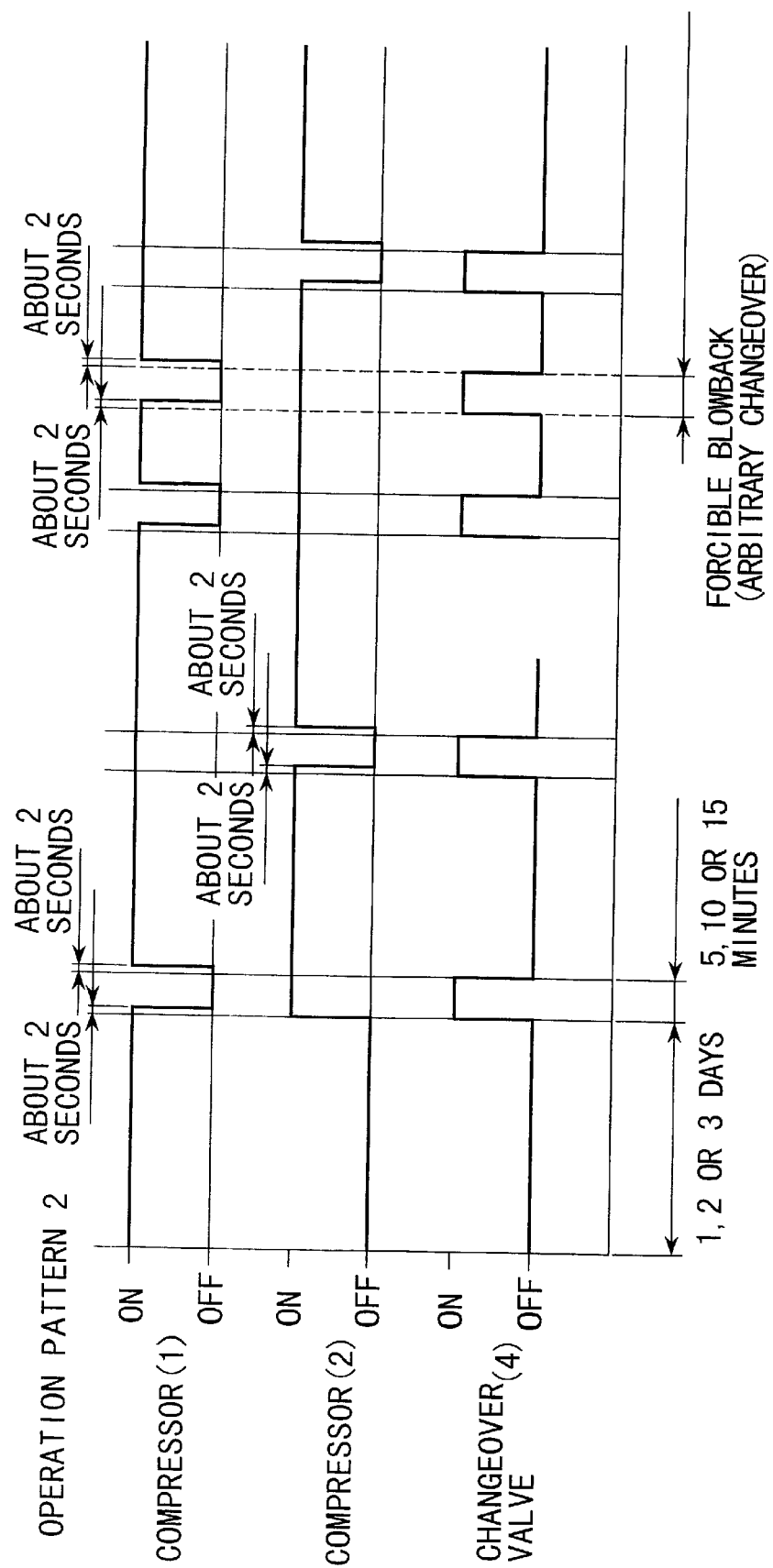
FIG. 9 is a timing chart illustrating operation pattern 2.

Operation Pattern 2 (FIG. 9)

This is an operation pattern wherein a smaller amount of air is used in the blowback aeration than in the normal aeration. The compressors 1 and 2 are operated in parallel in the normal operation mode. When blowback time comes, the changeover valve 4 is first changed over to the position for the blowback aeration by supplying a signal to the three-way electromagnetic valve 5. A few seconds thereafter (e.g., two seconds thereafter), compressor 1 is stopped. After the elapse of a predetermined blowback time (e.g., five minutes), the changeover valve 4 is first changed over, and then compressor 1 is resumed a few seconds thereafter (e.g., two seconds thereafter).

When the blowback aeration is executed next, compressor 2 is stopped. The timings when the changeover valve 4 is changed over to the position for the blowback aeration and compressor 2 is stopped, and the timings when the changeover valve 4 is changed over to the position for the normal aeration and compressor 2 is resumed, are similar to those of the case of compressor 1. According to operation pattern 2, the forcible blowback is executed by stopping one of the compressors 1 and 2 at the timings similar to those described above.

According to this example, the changeover valve 4 is changed over before one of the compressors is stopped, and is thereafter changed over before that compressor is resumed. Hence, the first and second valves 41 and 42 can be moved in the state where the amount of air contained in the changeover valve 4 is stable. Owing to this, the changeover valve 4 can be changed over smoothly.

Figure 10:
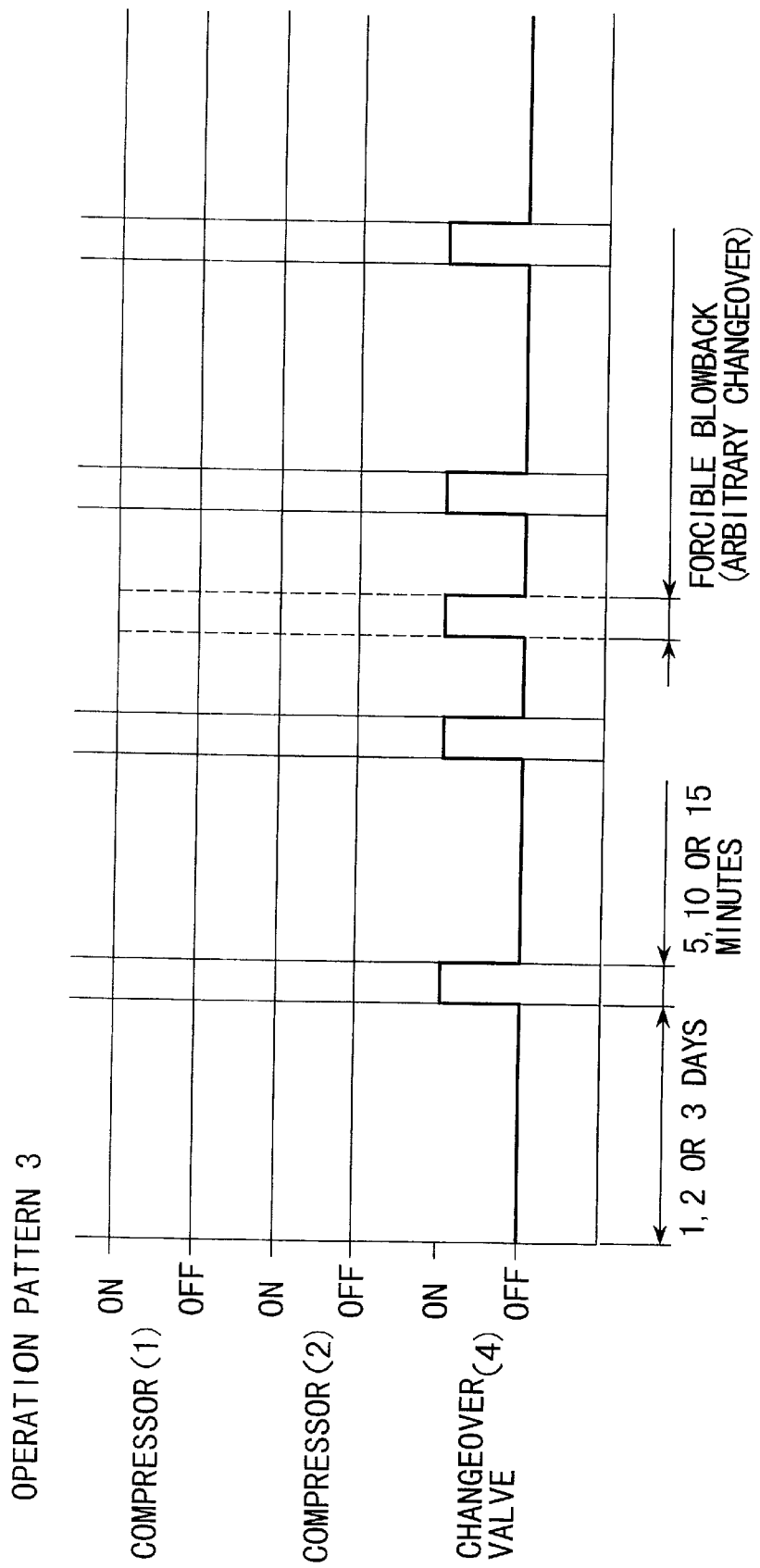
FIG. 10 is a timing chart illustrating operation pattern 3.

Operation Pattern 3 (FIG. 10)

This is an operation pattern wherein the amount of air used in the blowback aeration is the same as that used in the normal aeration. The compressors 1 and 2 are operated in parallel at all times. When the blowback time set for the controller 13 comes, the three-way electromagnetic valve 5 is operated for a predetermined blowback time (e.g., for five minutes), and thereafter the changeover valve 4 is changed over to the position used for the blowback aeration.

As can be understood from FIGS. 7A and 7B, the present embodiment is advantageous in that the three-way electromagnetic valve 5 is only required to control the ON/OFF of the back-pressure air to the changeover valve 5. Hence, the electromagnetic valve 5 may be small in size and capacity. In comparison with the one used in the conventional system, the electromagnetic valve employed in the present invention is reduced about 5% in terms of the volume, about 10% in terms of the mass, about 10% in terms of the amount of current consumed, and about 20% in terms of the manufacturing cost. Needless to say, in the operation patterns 1–3 described above, a certain amount of air is kept supplied in the normal-aeration direction at all times, including the time when the blowback aeration is executed.

As can be seen from the foregoing, the embodiment of the present invention can switch the operation patterns determined for the compressors and the changeover means, in response to a command supplied from the controller. Hence, the amount of air used in the normal aeration mode and that used in the blowback aeration mode can be easily varied. For example, the amount of air used in the blowback aeration mode can be easily varied in three steps, namely, twice the amount of air supplied in the normal aeration mode, equal to this amount of air, and half the amount of air.

In the embodiment described above, the changeover means is made up of a three-way electromagnetic valve to which back-pressure air from a common air tank is supplied; and a changeover valve supplied with the back-pressure air from the three-way electromagnetic valve and changed over between the normal aeration position and the blowback aeration position. With this structure, the three-way electromagnetic valve can be small in size and capacity. Moreover, the changeover means can be connected to the common air tank directly, i.e., without using a hose. This structure is effective in providing a small-sized, low-priced automatic blowback blower.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A blower for supplying compressed air to a predetermined place, comprising:

a plurality of compressors;

a common air tank for storing compressed air supplied from the compressors;

a switching device for switching the compressed air taken in from the air tank between a first supply state and a second supply state; and a controller for controlling operations of the compressors and a switching operation of the switching device, said controller being capable of selecting one operation pattern from among a plurality of operation patterns determined by combinations between the compressors and the switching device.

2. A blower according to claim 1, wherein said switching device is a changeover valve having: an intake port from which the compressed air supplied from the air tank is taken in; a first discharge port used in the first supply state; and a second discharge port used in the second supply port, and said changeover valve selects one of the first and second discharge ports and discharges the compressed air taken in from the intake port to the selected discharge port.

3. A blower according to claim 2, wherein said controller selectively drives the compressors, and when said changeover valve is changed over to the second discharge port, the controller selects an operation pattern under which the compressors are driven momentarily in an overlap manner.

4. A blower according to claim 2, wherein said controller drives both the compressors simultaneously, and each time said changeover valve is changed over to the second discharge port, the compressors are alternately stopped in accordance with a period in which the second discharge port is used for air supply, a time when the changeover valve is changed over being shifted from a time when the compressors are selectively stopped.

5. A blower for supplying compressed air to a predetermined place, comprising:

a compressor;

an air tank for storing compressed air supplied from the compressor;

a changeover valve including: an intake port from which the compressed air supplied from the air tank is taken in; a first discharge port; a second discharge port; a valve body movable such that the intake port selectively communicates with one of the first and second discharge ports; a member for urging the valve body to a position where the valve body allows the intake port to communicate with the first discharge port; a back-pressure chamber for producing a back pressure which enables the valve body to move, against an urging force of the member, to a position where the valve body allows communication between the intake port and the second discharge port; and a back-pressure intake port from which the back pressure is taken into the back-pressure chamber, said valve body of the changeover valve being moved by the urging force of the member to the position where the valve body allows the intake port to communicate with the first discharge port, and when the back pressure is taken into the back-pressure chamber, said valve body is moved by the back pressure to the position where the valve body enables the intake port to communicate with the second discharge port; and a valve including an intake port from which the compressed air supplied from the air tank is taken in, the compressed air taken in from the intake port being supplied to the back-pressure intake port of the changeover valve when the changeover valve supplies the compressed air of the air tank to the second discharge port.

6. A blower according to claim 2, wherein the intake port of the changeover valve is connected directly to the air tank.

7. A blower according to claim 5, wherein the intake port of the changeover valve is connected directly to the air tank.

8. A blower according to claim 5, wherein the intake port of the valve, through which the compressed air from the air tank is supplied to the back-pressure intake port of the changeover valve, is connected directly to the air tank.

9. A blower according to claim 5, wherein the valve, through which the compressed air is supplied to the back-pressure intake port of the changeover valve, is assembled together with the changeover valve.

10. A blower according to any one of claims 1, 2, 3 and 4, wherein said first supply state is a normal aeration state, and said second supply state is a blowback aeration state.

11. A blower according to any one of claims 5, 6, 7, 8 and 9, wherein said first discharge port is a port used when normal aeration is executed, and said second discharge port is a port used when blowback aeration is executed.

* * * * *